J. P. WRIGHT.
METHOD OF MAKING NOISELESS GEARS.
APPLICATION FILED NOV. 28, 1916.
1,315,896. Patented Sept. 9, 1919.
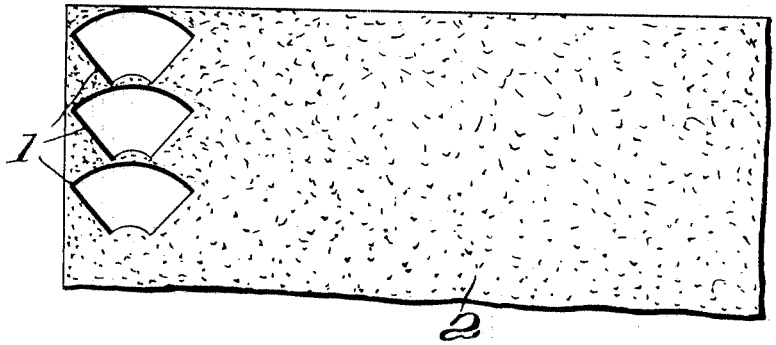
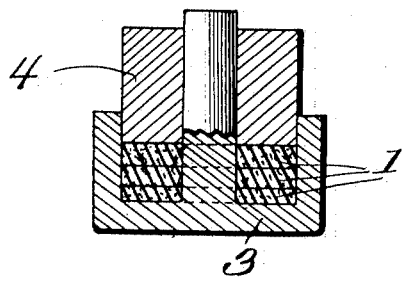
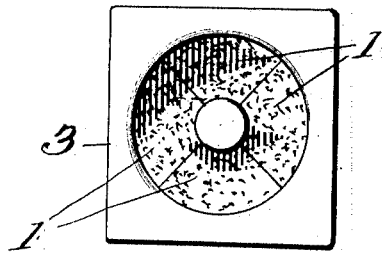
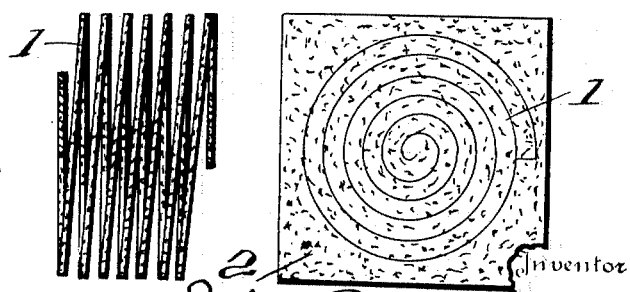

UNITED STATES PATENT OFFICE.

JOHN P. WRIGHT, OF NEWARK, DELAWARE.

METHOD OF MAKING NOISELESS GEARS.

1,315,896.  Specification of Letters Patent.  Patented Sept. 9, 1919.

Application filed November 28, 1916. Serial No. 133,927.

*To all whom it may concern:*

Be it known that I, JOHN P. WRIGHT, a citizen of the United States, residing at Newark, in the county of New Castle and State of Delaware, have invented certain new and useful Improvements in Methods of Making Noiseless Gears, of which the following is a specification.

My invention relates to an improved method of making noiseless gears from non-metallic substances, such as fibrous or filamentous material.

Noiseless gears or blanks at the present time are cut from sheets already formed from fibrous or filamentous material and a binder of a phenolic condensation product, such as, or similar to, the material known commercially as "bakelite"; and in thus cutting them from sheets, all of the center hole and outer edges become a waste product; or in instances where there is no center hole and the disk is solid, even then the waste around the rounded outer edges, when a circular gear or blank is cut from a sheet has amounted to a very considerable item of loss. It can be readily seen that in gears of certain dimensions, in which there is a center hole and only a ring left, that is to say where the center hole is large in proportion to the outside diameter, there might be a waste of material reaching as high as 200%, or the aggregate of the material lost in forming the center hole and the area between a circle and a square of corresponding diameter.

It is therefore the object of my present invention, while employing this same material, which is the regular standard article of commerce, to save this enormous waste, and in so doing to follow the usual course of superimposing sheets of paper or fabric coated or impregnated with the binder of phenolic condensation product; but instead of superimposing complete sheets, my present invention has reference to the building of these gears or blanks for gears by a method of cutting out curved-out blanks from the treated sheets before they are compressed, then superimposing these blanks in layers, then compressing them into a solid body under heavy pressure and heat in order to change the nature of the binder, thus making the product hard and homogeneous throughout, all of which may be accomplished in various different ways, as will be hereinafter specified, but all of which contemplates an entire saving of all the material and scrap involved, much of which hitherto has been a waste product, but which I accomplish by building the material up in molds, which give it shape and form, and giving it the required pressure or compression to make it solid and homogeneous, thus imparting to it all the strength of a gear built up of laminations of complete rings of the fibrous or filamentous material.

Furthermore, my present invention contemplates the formation of these gears initially fashioned with either smooth or toothed outer edges, and with a smooth or key way center, if desired, although as a rule the teeth and key-ways are adapted to be formed afterward, as has been the custom heretofore.

In the accompanying drawings:

Figure 1 is a diagrammatic view, showing a blank of the material from which the segments are cut, showing the least possible amount of waste;

Fig. 2 is a vertical sectional view of the die and plunger in which the segments are placed;

Fig. 3 is a plan view of the same;

Fig. 4 shows a spiral blank; and

Fig. 5 shows a strip of the material made up in a continuous coil.

While the segments are shown in quarter circles, it is very obvious that they might be of different lengths, thirds, or fifths, for instance. These segments 1 are stamped or punched from the sheet 2 of fibrous or filamentous product, such as paper or textile fabric coated or impregnated with a phenolic condensation product binder, such as is commercially known as bakelite, which has the characteristic of softening under the influence of heat, and then hardening, thus changing the material into a hard, insoluble and homogeneous mass, which is unaffected by water or any of the ordinary solvents or oils. These segments are formed either with or without teeth or key-way as desired, after which they are placed in layers in the die 3, as shown in Figs. 2 and 3. Successive layers are placed so as to break joints. After a sufficient number of these are laid in the die to form a gear of predetermined thickness, the plunger 4 is brought down with the required pressure, and the whole number of layers are thus brought into a solid, compact, homogeneous, mass having the required strength and rigidity.

My invention is not necessarily confined to the use of segments, as it would be possible to build the gears up of continuous coils of flat material, either cut spirally from the sheet material and coiled in the die, or separated ropes or twisted threads could also be used to fill the die for certain special sizes. Where continuous coils of flat material are employed, they could be coiled into the die by cutting V-shaped notches out of the inside, so there would be no overlap of material, the fundamental idea of this invention being to build the gears up in their original circular form without the loss either of centers or corners, as heretofore.

With my present invention, any material left in the sheet after cutting the segments, instead of being scrapped, is thrown into the mold with the stock which goes to make up the completed gear.

If desired, a continuous ring may be placed at either end, although this is not absolutely necessary; and in the formation of the gear it is sometimes customary to fasten a metal plate or ring outside.

When thus formed, the usual teeth and key-way may be milled upon the gear, if the segments are not already formed with them, as previously mentioned.

A gear thus constructed has all the strength of a gear with continuous rings, and at an enormous saving of material, which cannot otherwise in any way be utilized, is effected, as the segments are cut from the blank to the utmost advantage, the entire center portion is saved, which ordinarily has to be cut out with a lathe, and only a fraction of the corners remain, which I use, whereas heretofore all that portion at the corners between a circle and a square was lost, as these rings have ordinarily been stamped from a square, which has been previously cut from the main sheet.

I claim:

1. The herein-described method of forming noiseless gears, which consists in placing laminations of filamentous material, in segments of a size less than a complete circle, containing a phenolic condensation product binder or its equivalent around a central core and applying pressure thereto.

2. The herein-described method of forming noiseless gears by placing segments of filamentous material coated with a phenolic condensation product binder or its equivalent around a central core, with the inner edges forming the bore or hole in the center of the gear, and applying pressure thereto.

3. The herein-described method of forming noiseless gears by placing segments of filamentous material impregnated with a phenolic condensation product binder, or its equivalent, around a central core with the inner edges forming the bore or hole in the center of the gear, the outer edge being adapted to have formed thereon the toothed periphery, and applying pressure thereto.

4. The herein-described method of forming noiseless gears, which consists in cutting segments from a compressible material previously treated with a phenolic condensation product binder, placing these laminations in a mold around a solid center or core, and finally compressing them to make a solid, homogeneous mass or body.

5. The herein-described method of forming noiseless gears which consists in forming segments from a compressible material, previously treated with a phenolic condensation product binder, placing these segments in broken-jointed laminations around a solid center or core, and finally compressing them to make a solid homogeneous mass.

In testimony whereof I affix by signature.

JOHN P. WRIGHT.